United States Patent [19]

Rousselot

[11] Patent Number: 4,821,592
[45] Date of Patent: Apr. 18, 1989

[54] BALL CAGE FOR A WORM-AND-NUT TYPE DRIVE UNIT

[75] Inventor: André J. Rousselot, Scionzier, France

[73] Assignee: Somfy, Cluses, France

[21] Appl. No.: 180,357

[22] Filed: Apr. 11, 1988

[30] Foreign Application Priority Data

Apr. 21, 1987 [FR] France ................. 87 05593

[51] Int. Cl.[4] .............................. F16H 25/22
[52] U.S. Cl. ................... 74/424.8 NA; 74/459
[58] Field of Search ............ 74/424.8 NA, 459; 384/49, 526

[56] References Cited

U.S. PATENT DOCUMENTS

| | | | |
|---|---|---|---|
| 975,591 | 11/1910 | Whitney | 74/459 X |
| 1,448,426 | 3/1923 | Altgelt | 74/459 |
| 2,768,532 | 10/1956 | Russell | 74/424.8 NA |
| 3,003,830 | 10/1961 | Blazek et al. | 384/49 |
| 3,514,166 | 5/1970 | Coley | 384/49 |
| 4,199,999 | 4/1980 | Metz | 74/89.15 X |

FOREIGN PATENT DOCUMENTS 55-155921  12/1980  Japan ..................... 384/49

Primary Examiner—Allan D. Herrmann
Attorney, Agent, or Firm—Laff, Whitesel, Conte & Saret

[57] ABSTRACT

The invention relates to a ball cage consisting of a cylindrical sleeve 1 provided with ball seats 7, 8 intended to receive balls 9, 10 intended to cooperate with a worm 11. The sleeve 1 is intended to be mounted in a cylindrical tube 2.

The balls 9, 10 are retained in their seats on the one hand by a narrowed portion formed at the intersection of the perforations 7, 8 containing the balls and of a helicoidal bead 13 extending over the inner face of the cage, and on the other hand by projections 15 to 18 provided at the outer ends of the perforations. The balls are forced into their seats. The ball gage is used in the operation of doors or gates.

3 Claims, 1 Drawing Sheet

BALL CAGE FOR A WORM-AND-NUT TYPE DRIVE UNIT

FIELD OF THE INVENTION

The present invention relates to a ball cage of synthetic material for a ball nut in a worm-and-nut type drive unit, said cage consisting of a cylindrical sleeve provided with ball seats formed by radial cylindrical perforations whose diameter is substantially equal to the diameter of the balls and which are distributed over at least one helix corresponding to the helicoidal groove or grooves of the worm, each perforation being intended to receive a ball freely rotatable in its seat for cooperation with the helicoidal groove or grooves of the worm in order to secure the nut and the worm to one another.

PRIOR ART

Worm-and-nut drives of this kind are for example used for operating doors and gates. In known worm-and-nut drives the balls are retained in their cage on the one hand by the worm and on the other hand by a cylindrical tube which surrounds the ball cage and which may be an integral part of the component which is to be operated, for example a door or gate. In order to enable the balls to be placed in their seats, it is indispensable for the ball cage to be mounted on the worm. In addition, even if the worm is held vertical, balls tend to fall out of their seats, and in order to retain them while the tube is being fitted it is customary to put grease in the seats. Despite this precaution, it is not rare for the balls to fall out of their seats. Furthermore, the grease used for this purpose has a high viscosity, which is not always compatible with the intended use. In addition, when a worm-and-nut drive of this kind has to be dismantled, that is to say when the worm has to be removed from the ball cage, the balls will drop out of the cage, with readily imaginable consequences. For the same reason, it is obviously not possible to keep a stock of only the ball cages, equipped with balls.

The invention seeks to provide a ball cage in which the balls are retained without the aid of the worm or of an outer tube.

SUMMARY OF THE INVENTION

To this end the ball cage according to the invention is characterized in that the inner surface of the cage has a bead-like portion of increased thickness of material extending over the perforations, along each helix on which the perforations are disposed, and in that the cylindrical surface of the perforations has a narrowed portion at its intersection with said bead and is provided at its outer end with projections, in such a manner that once the ball has been forced into its seat it is retained in the latter by said narrowed portion and by said projections.

Since the ball cage is in all cases intended to be mounted in a sleeve or in a cylindrical hole, the projections at the outer end of the cylindrical perforations have to withstand no other force than the weight of the balls when the latter are placed in position. Two or three small projections are quite sufficient for this purpose and the slight resistance which they offer to the insertion of the balls into the perforations can be overcome by simple finger pressure. The internal narrowed portions of the perforations are preferably spherical in shape, with a radius close to that of the balls, but they could also be of conical or pyramidal shape.

The balls can be placed in position in the cage without the worm being fitted, without grease and without special precautions. This operation can easily be automated. It is thus possible to keep a stock of cages equipped with balls and ready for mounting on a worm. During the mounting operation the ends of the helicoidal beads serve as guides for the worm grooves, so that the latter immediately take up position facing the balls. In addition, the beads prevent the rotation of the worm in the ball cage from exerting a cam action liable to drive the balls out of their seats. In consequence the ball cage can be mounted on the worm without an outer tube being fitted. The worm-and-nut assembly can of course be dismantled without any danger of the balls escaping from the cage. When the cage according to the invention is made of synthetic material, it can easily be produced by molding, without any additional machining.

In a worm-and-nut assembly containing a ball cage according to the invention the section of the beads is preferably complementary to that of the grooves of the worm.

BRIEF DESCRIPTION OF THE DRAWINGS

The accompanying drawings illustrate by way of example one embodiment of the invention.

DESCRIPTION OF THE PREFERRED EMBODIMENT

Figure 1:
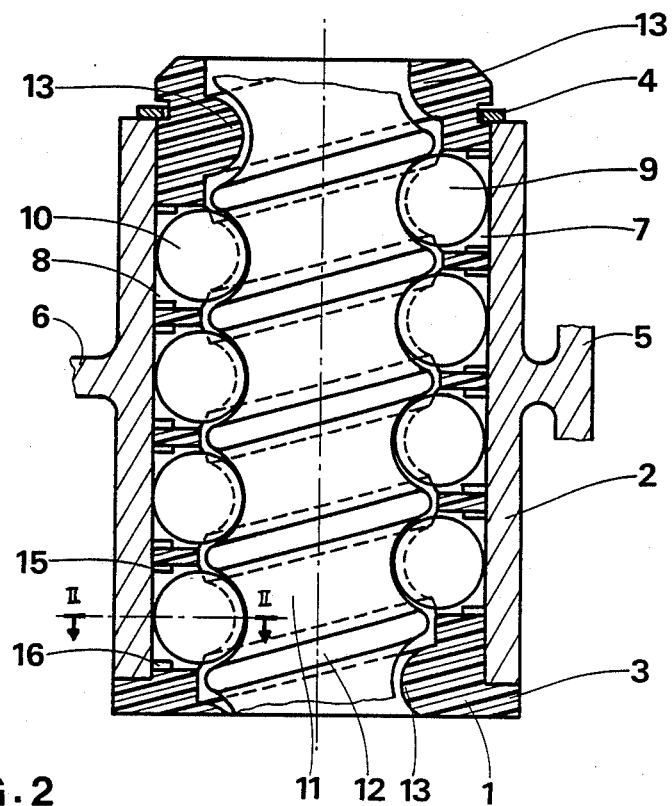
FIG. 1 is a view in axial section of a worm-and-nut drive containing a ball cage according to the invention.
Figure 2:
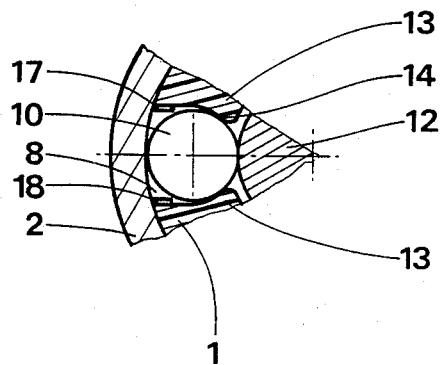
FIG. 2 is a partial section on the line II—II in FIG. 1.

The worm-and-nut drive shown in the drawings comprises a ball cage 1 in the form of a cylindrical sleeve of synthetic material, housed in a cylindrical tube 2, in which it is retained at one end by a shoulder 3 and at the other end by a split ring 4 mounted in a groove in the cage 1. As indicated by the broken parts 5 and 6, the tube 2 forms part of a component (not shown), which could for example be a member making a connection to a gate. The cage 1 is provided with radial cylindrical perforations, such as 7 and 8, disposed along four angularly distant generatrices and each containing a ball, such as 9 and 10, whose diameter is slightly smaller than the diameter of the radial cylindrical perforation and such that the balls can turn freely in the perforations. The perforations are in addition distributed over a helix corresponding to the helicoidal groove 11 of a worm 12 around which the ball cage 1 is mounted. The groove 11 has a profile in the form of an arc of a circle having a diameter corresponding to that of the balls. Each ball is free to turn in its seat formed by the perforation in the cage 1, the groove 11 of the worm, and the inside wall of the tube 2.

The inner surface of the cage 1 has a portion of increased thickness in the form of a bead 13 extending along the helix on which the perforations 7 and 8 are disposed, that is to say on a helix coinciding with the helicoidal groove of the worm 12. This bead 13 has a semicircular section with a radius slightly shorter than the radii of the balls and of the section of the groove 11, so that its center is situated on the axis of each perforation. The intersection of each perforation with the bead 13 forms a narrowed portion 14 in the form of a spherical zone whose radius is substantially equal to the radius of the ball. The outer end of each perforation, facing the tube 2, has four projections 15, 16, 17 and 18 distributed over the periphery of the perforation. The dimensions of these projections are such that the balls can be introduced from the outside by pressure compressing the projections, and the balls, when once introduced into their seats, are prevented by these projections from falling out.

Since the ball cage of synthetic material is produced by injection molding, the radial apertures 7 and 8 are formed by means of removable lateral rods whose ends are rounded to form the narrowed portions 14. The projections 15 to 18 are formed by hollows provided in the rods. The small dimensions of these projections permit the immediate withdrawal of the rods, during removal of the mold, through the resilient compression of the projections. The beads are formed by means of an unscrewing spindle or of a rotating tubular ejector.

The balls are forced into the perforations in the cage 1 by compressing the projections 15 to 16. They come to bear against the narrowed portion 14 without it being necessary for the cage to be mounted on a worm. Finger pressure is sufficient. The introduction of the balls into their seats can easily be automated. The ball cage can then be held in stock complete with its balls, without any risk of the balls dropping out of the cage.

A ball cage of this type can be mounted on a worm 12 before or after the ball cage is fitted into its tube 2. The helicoidal bead 13 serves as a screwthread for the introduction of the worm into the ball cage, so that it is ensured that the groove 11 of the worm will be positioned facing the balls. In the absence of a tube 2 during the assembly or dismantling of the worm-and-nut drive, the bead 13 will prevent the balls from being pushed back out of their seats by a cam action exerted by the worm. There is therefore no risk that a ball will escape from its seat.

Numerous variant embodiments of the invention are obviously possible. The number of rows of balls may be different from four. However, the balls will preferably be distributed over at least three generatrices. There may be any number of projections 15 to 18. The sleeve may be provided with a plurality of beads 13, the number of the latter being equal to the number of helicoidal grooves of the worm. The narrowed portion 14, preferably of spherical shape, could be differently shaped, for example conical. The ball cage may be made of any material. When it is made of metal, the projections 15 to 18 could be formed by embossing the material at the edge of the perforation.

I claim:

1. A ball cage for a ball nut in a worm-and-nut type drive unit, comprising a cylindrical sleeve (1) provided with ball seats formed by radial cylindrical perforations (7, 8) whose diameter is substantially equal to the diameter of the balls (9, 10) and which are distributed over at least one helix corresponding to the helicoidal groove or grooves of the worm, each perforation being intended to receive a ball (9, 10) freely rotatable in its seat for cooperation with the helicoidal groove or grooves of the worm in order to secure the nut and the worm to one another, wherein the inner surface of the cage (1) has a bead-like portion (13) of increased thickness of material extending over the perforations (7, 8), along each helix on which said perforations are disposed, and wherein the cylindrical surface of the perforations has a narrowed portion (14) at its intersection with said bead and is provided at its outer end with projections (15 to 18), in such a manner that once the ball has been forced into its seat it is retained in the latter by said narrowed portion and by said projections.

2. A ball cage as claimed in Claim 1, wherein said bead (13) has a section forming an arc of a circle and wherein said narrowed portion (14) is spherical in shape with a radius substantially equal to that of the ball.

3. A worm-and-nut drive in which the worm is provided with at least one helicoidal groove (11) and the nut comprises a cylindrical ball cage (1) of synthetic material provided with radial perforations (7, 8) distributed over the helix corresponding to the helicoidal groove of the worm and each containing a ball (9, 10) freely rotatable in its seat and engaging with the groove of the worm, wherein the inside surface of the ball cage has at least one bead-like portion (13) of increased thickness extending along the helix on which the perforations are disposed, facing said perforations and in the groove of the worm, the section of said bead being complementary to that of the groove, and wherein the cylindrical surface of the perforations has at its intersection with the bead a narrowed portion (14) of spherical shape with a radius substantially equal to that of the ball and at its outer end has projections (15 to 18), in such a manner that the ball is retained in its seat by said narrowed portion and by said projections.

* * * * *